(12) United States Patent
Gangaraju et al.

(10) Patent No.: US 12,008,418 B2
(45) Date of Patent: Jun. 11, 2024

(54) AUTOMATED CAUSAL ANALYSIS OF ISSUES AFFECTING WORKLOADS EXECUTING IN AN INFORMATION TECHNOLOGY INFRASTRUCTURE

(71) Applicant: Dell Products L.P., Round Rock, TX (US)

(72) Inventors: Vindhya Gangaraju, Davanagere (IN); Vinay Sawal, Fremont, CA (US); Jayanth Kumar Reddy Perneti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 437 days.

(21) Appl. No.: 17/462,710

(22) Filed: Aug. 31, 2021

(65) Prior Publication Data

US 2023/0066843 A1    Mar. 2, 2023

(51) Int. Cl.
*G06F 9/50* (2006.01)
*G06F 11/14* (2006.01)

(52) U.S. Cl.
CPC ........ *G06F 9/5083* (2013.01); *G06F 11/1448* (2013.01); *G06F 2201/805* (2013.01)

(58) Field of Classification Search
None
See application file for complete search history.

(56) References Cited

U.S. PATENT DOCUMENTS

| | | | |
|---|---|---|---|
| 8,429,097 B1 * | 4/2013 | Sivasubramanian | ........................ G06F 16/2282 706/12 |
| 9,465,550 B1 * | 10/2016 | Lippitt | .................. G06F 3/0605 |
| 9,557,792 B1 * | 1/2017 | Potlapally | ............. G06F 1/3206 |
| 10,049,335 B1 * | 8/2018 | Narkier | ............. G06Q 10/0637 |

(Continued)

OTHER PUBLICATIONS

Kirshner, Sergey et al. "ICA and ISA using Schweizer-Wolff measure of dependence". ICML '08: Proceedings of the 25th international conference on Machine learning. pp. 464-471. (Year: 2008).*

(Continued)

*Primary Examiner* — Adam Lee
(74) *Attorney, Agent, or Firm* — Ryan, Mason & Lewis, LLP

(57) ABSTRACT

An apparatus comprises a processing device configured to obtain workload traces characterizing resource execution metrics associated with workloads executing in an information technology infrastructure and to generate sets of workload causality profiles characterizing relationships between the resource execution metrics, the sets of workload causality profiles comprising first and at least second sets of workload causality profiles generated using first and at least second different types of models. The processing device is also configured to determine sets of causal topics comprising recurring patterns of the relationships between different ones of the resource execution metrics found in each of the sets of workload causality profiles. The processing device is further configured to identify clusters of causal topics each comprising at least one causal topic that is part of the first (Continued)

and second sets of causal topics, and to perform diagnosis of issues affecting the workloads based on the identified clusters.

20 Claims, 15 Drawing Sheets

(56) References Cited

U.S. PATENT DOCUMENTS

| | | | | |
|---|---|---|---|---|
| 10,356,167 | B1* | 7/2019 | Dolas | H04L 67/1034 |
| 10,855,535 | B1* | 12/2020 | Natanzon | H04L 41/0816 |
| 2004/0262409 | A1* | 12/2004 | Crippen | H05K 7/20836 |
| | | | | 165/80.3 |
| 2005/0278453 | A1* | 12/2005 | Cherkasova | H04L 65/752 |
| | | | | 709/231 |
| 2007/0198679 | A1* | 8/2007 | Duyanovich | G06F 11/3409 |
| | | | | 709/223 |
| 2008/0016412 | A1* | 1/2008 | White | G06F 11/3409 |
| | | | | 714/48 |
| 2011/0137847 | A1* | 6/2011 | Fahner | G06Q 40/02 |
| | | | | 706/46 |
| 2011/0145657 | A1* | 6/2011 | Bishop | H04L 63/1433 |
| | | | | 714/47.1 |
| 2014/0172371 | A1* | 6/2014 | Zhu | G06Q 10/00 |
| | | | | 702/185 |
| 2017/0060769 | A1* | 3/2017 | Wires | G06F 12/1018 |
| 2017/0177416 | A1* | 6/2017 | Altman | G06F 11/3414 |
| 2017/0220387 | A1* | 8/2017 | Borowiec | G06F 3/0631 |
| 2017/0257308 | A1* | 9/2017 | Cropper | H04L 67/10 |
| 2017/0364415 | A1* | 12/2017 | Formato | G06F 11/1464 |
| 2018/0287856 | A1* | 10/2018 | Whitner | H04L 41/12 |
| 2019/0042142 | A1* | 2/2019 | Casmira | G06F 3/0659 |
| 2019/0377508 | A1* | 12/2019 | Bahar | G06F 3/061 |
| 2020/0097347 | A1* | 3/2020 | Mahindru | G06F 11/076 |
| 2020/0097348 | A1* | 3/2020 | Mahindru | G06F 11/008 |
| 2020/0097349 | A1* | 3/2020 | Mahindru | G06F 11/0793 |
| 2020/0097352 | A1* | 3/2020 | Mahindru | G06F 11/079 |
| 2020/0097358 | A1* | 3/2020 | Mahindru | G06F 11/076 |
| 2020/0099592 | A1* | 3/2020 | Mahindru | H04L 41/5019 |
| 2020/0358682 | A1* | 11/2020 | Rosa | H04L 43/065 |
| 2021/0037353 | A1* | 2/2021 | Locascio | H04L 67/02 |
| 2021/0124614 | A1* | 4/2021 | Gupta | G06F 11/3409 |
| 2021/0304228 | A1* | 9/2021 | Cui | G06Q 30/0204 |
| 2021/0382754 | A1* | 12/2021 | Nimmagadda | G06F 9/5016 |
| 2021/0406134 | A1* | 12/2021 | Yoshii | G06F 11/1466 |
| 2022/0043599 | A1* | 2/2022 | Kulkarni | G06F 3/0653 |
| 2022/0100939 | A1* | 3/2022 | Mishra | G06F 30/367 |
| 2022/0129906 | A1* | 4/2022 | Lee | G06Q 10/06375 |
| 2022/0229698 | A1* | 7/2022 | Lo | G06F 9/5027 |
| 2022/0318118 | A1* | 10/2022 | Adamson | G06F 11/3419 |
| 2022/0337480 | A1* | 10/2022 | Vanajakshi | H04L 12/4641 |
| 2022/0377612 | A1* | 11/2022 | Radunovic | H04W 24/10 |
| 2022/0391519 | A1* | 12/2022 | Trim | G06N 3/0455 |

OTHER PUBLICATIONS

Liu, Keying et al. "Blind separation of dependent sources using Schweizer-Wolff Measure". International Conference on Uncertainty Reasoning and Knowledge Engineering. IEEE. (Year: 2012).*
L. Rüschendorf, "On the Distributional Transform, Sklar's Theorem, and the Empirical Copula Process," Journal of Statistical Planning and Inference, 2009, 11 pages.
K. Sasirekha et al., "Agglomerative Hierarchical Clustering Algorithm—A Review," International Journal of Scientific and Research Publications, vol. 3, Issue 3, Mar. 2013, 3 pages.
D. M. Blei et al., "Latent Dirichlet Allocation," Journal of Machine Learning Research, vol. 3, Jan. 2003, pp. 993-1022.
S. Kirshner et al., "ICA and ISA Using Schweizer-Wolff Measure of Dependence," Machine Learning, Proceedings of the Twenty-Fifth International Conference, Jun. 5-9, 2008, 8 pages.
J. Muñoz et al., "Comparison of Statistical Methods Commonly used in Predictive Modelling," Journal of Vegetation Science, vol. 15, 2004, pp. 285-292.
D. B. Rubin, "Causal Inference Using Potential Outcomes: Design, Modeling, Decisions," Journal of the American Statistical Association, vol. 100, No. 469, Mar. 2005, pp. 322-331.
Dell EMC, "Dell EMC Data Domain Deduplication Storage Systems," Spec Sheet h11340, 2018, 5 pages.
Dell EMC, "Dell EMC Avamar," Data Sheet h2568.20, 2021, 2 pages.
Dell EMC, "Dell EMC Data Domain Operating System," Data Sheet h6811, 2018, 5 pages.
NVM Express, "NVM Express, Revision 1.3," NVM Express, May 1, 2017, 282 pages.

* cited by examiner

AUTOMATED CAUSAL ANALYSIS OF ISSUES AFFECTING WORKLOADS EXECUTING IN AN INFORMATION TECHNOLOGY INFRASTRUCTURE

FIELD

The field relates generally to information processing, and more particularly to storage in information processing systems.

BACKGROUND

As the amount of data stored in a storage environment increases, the task of performing backups in the storage environment becomes more complex. Even with advanced backup management solutions in place, backup tasks may fail or encounter issues during execution. With a large number of backup tasks being performed, it is increasingly difficult to diagnosis the underlying causes of failures or issues encountered during execution of the backup tasks. If not properly diagnosed and remediated, such failures or issues associated with the execution of backup tasks may impact reliability and disrupt operations of the storage environment.

SUMMARY

Illustrative embodiments of the present invention provide techniques for automated causal analysis of issues affecting workloads executing in an information technology infrastructure.

In one embodiment, an apparatus comprises at least one processing device comprising a processor coupled to a memory. The at least one processing device is configured to perform the steps of obtaining a plurality of workload traces characterizing resource execution metrics associated with a plurality of workloads executing in an information technology infrastructure and generating two or more sets of workload causality profiles for the plurality of workloads based at least in part on the plurality of workload traces, a given one of the workload causality profiles characterizing relationships between different ones of the resource execution metrics for a given one of the plurality of workloads executing in the information technology infrastructure, wherein the two or more sets of workload causality profiles comprise a first set of workload causality profiles generated using a first type of model and at least a second set of workload causality profiles generated using a second type of model different than the first type of model. The at least one processing device is also configured to perform the step of determining two or more sets of causal topics based at least in part on the two or more sets of workload causality profiles, a given one of the causal topics comprising a recurring pattern of the relationships between different ones of the resource execution metrics found in a given one of the two or more sets of workload causality profiles, wherein a first one of the two or more sets of causal topics is generated based at least in part on the first set of workload causality profiles and at least a second one of the two or more sets of causal topics is generated based at least in part on the second set of workload causality profiles. The at least one processing device is further configured to perform the steps of identifying one or more clusters of causal topics, a given one of the one or more clusters of causal topics comprising at least a given causal topic that is part of the first set of causal topics and the second set of causal topics, and performing diagnosis of one or more issues affecting at least a subset of the plurality of workloads executing in the information technology infrastructure based at least in part on the identified one or more clusters of causal topics.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
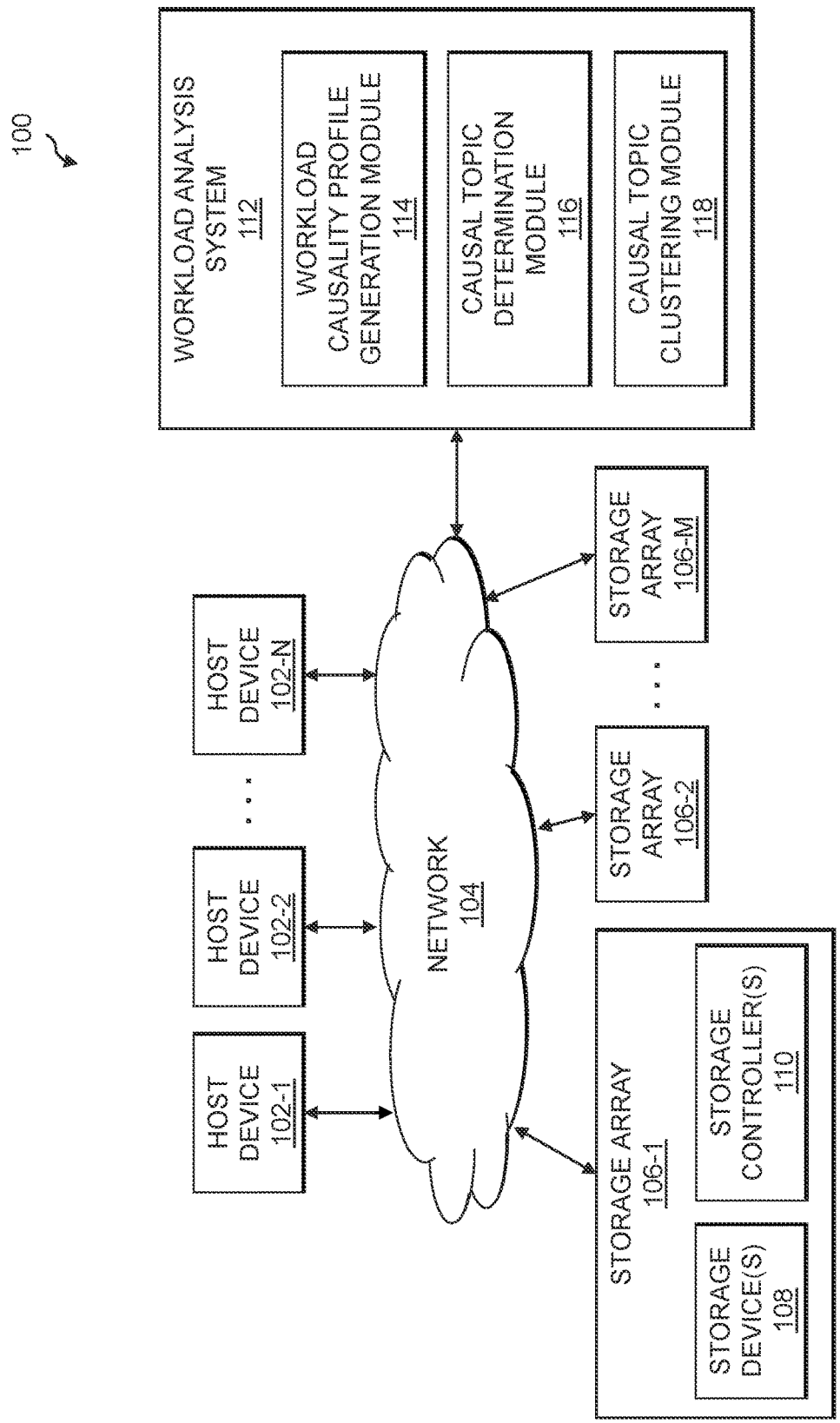
FIG. 1 is a block diagram of an information processing system configured for automated causal analysis of issues affecting workloads executing in an information technology infrastructure in an illustrative embodiment of the invention.

FIG. 1 shows an information processing system 100 configured in accordance with an illustrative embodiment to perform automated causal analysis of issues affecting workloads executing in an information technology (IT) infrastructure. The information processing system 100 comprises one or more host devices 102-1, 102-2, ... 102-N (collectively, host devices 102) that communicate over a network 104 with one or more storage arrays 106-1, 106-2, ... 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

In the information processing system 100 of FIG. 1, the host devices 102 are assumed to submit processing jobs, tasks or other workloads for execution on different ones of the storage arrays 106. A workload analysis system 112 also coupled to network 104 is configured to monitor such jobs, tasks or other workloads, and perform an automated causal analysis of resource execution metric behavior at scale in the storage arrays 106. The workload analysis system 112 implements a workload causality profile generation module 114, a causal topic determination module 116, and a causal topic clustering module 118.

The workload analysis system 112 is configured to obtain a plurality of workload traces characterizing resource execution metrics associated with a plurality of workloads executing in an IT infrastructure (e.g., such as an IT infrastructure including the storage arrays 106). The workload causality profile generation module 114 is configured to generate two or more sets of workload causality profiles for the plurality of workloads based at least in part on the plurality of workload traces. The workload causality profiles characterize relationships between different ones of the resource execution metrics for the plurality of workloads executing in the IT infrastructure. The two or more sets of workload causality profiles comprise a first set of workload causality profiles generated using a first type of model and at least a second set of workload causality profiles generated using a second type of model different than the first type of model.

The causal topic determination module 116 is configured to determine two or more sets of causal topics based at least in part on the two or more sets of workload causality profiles. The causal topics comprise recurring patterns of the relationships between different ones of the resource execution metrics found in the two or more sets of workload causality profiles. A first one of the two or more sets of causal topics is generated based at least in part on the first set of workload causality profiles and at least a second one of the two or more sets of causal topics is generated based at least in part on the second set of workload causality profiles.

The causal topic clustering module 118 is configured to identify one or more clusters of causal topics. The one or more clusters of causal topics comprise at least a given causal topic that is part of the first set of causal topics and the second set of causal topics. The workload analysis system 112 is configured to perform diagnosis of one or more issues affecting at least a subset of the plurality of workloads executing in the IT infrastructure based at least in part on the identified one or more clusters of causal topics.

In some embodiments, the storage arrays 106 provide an "active" tier of a storage backup system, with cloud-based storage (not explicitly shown in FIG. 1) providing an "inactive" tier of the storage backup system. In other embodiments, however, the storage arrays 106 may themselves provide both the active and inactive tier of the storage backup system. For example, a first subset of the storage arrays 106 (e.g., storage arrays 106-1 and 106-2) may provide the active tier while a second subset of the storage arrays 106 (e.g., storage arrays 106-3 through 106-M) may provide the inactive or backup tier. In some cases, it is possible for the same set of storage arrays 106 to provide both the active and inactive or backup tier of a storage backup system. For example, a first subset of the storage devices 108 of storage array 106-1 may provide an active tier while a second subset of the storage devices 108 of the storage array 106-1 may provide an inactive or backup tier. Various other examples are possible. It should thus be appreciated that the term "active tier" as used herein is intended to be broadly construed. An active tier may comprise an active tier of a multi-tier storage system, an active part of a single-tier storage system, etc. It should further be appreciated that, within the active tier, different types of storage devices may be utilized.

The workload analysis system 112 may be utilized in various different scenarios. For example, the workload analysis system 112 may be implemented as part of a Data Domain management center (DDMC) or Data Domain system manager (DDSM) of a suitably modified Dell EMC Data Domain system or Dell EMC PowerProtect DD system or environment. This enables display of notifications when issues are encountered for workloads, tasks or other types of workloads running on one or more of the storage arrays 106, as well as potentially when such issues are diagnosed, when remedial actions are proposed for correcting those issues and/or preventing such issues for future workloads, etc. Such information may be displayed within a Dell EMC Avamar Management Console Graphical User Interface (MCGUI) or a Networker Management Center (NMC) for issue analysis and remediation. Such information may also be displayed within an XtremIO Graphical User Interface (GUI), such as an XtremIO Management Server (XMS) GUI.

In some embodiments, the workload analysis system 112 is utilized by storage administrators or sales teams, which are notified when issues are encountered and/or diagnosed, as well as potentially when proposed remedial actions are made available. This helps the storage administrator or sales teams to proactively approach end-users to explain current or predicted storage problems (e.g., the underlying causes of jobs, tasks or other workloads running long) and to provide suggestions for preventing such storage problems, such as by deploying a new model of a storage backup system with latest features, expanding an existing storage backup system, virtual scale-out, performing data movement to cloud-based storage, etc.

At least portions of the functionality of the workload analysis system 112, such as the workload causality profile generation module 114, the causal topic determination module 116, and the causal topic clustering module 118, may be implemented at least in part in the form of software that is stored in memory and executed by a processor.

Although shown as being implemented external to the storage arrays 106 in the FIG. 1 embodiment, it should be appreciated that the workload analysis system 112 may be implemented at least in part internal to one or more of the storage arrays 106 (e.g., such as on one or more of the storage controllers 110 of the storage array 106-1), on one or more of the host devices 102, and/or on a server external to the host devices 102 and storage arrays 106, combinations thereof, etc. Further, multiple instances of the workload analysis system 112 may be provided (e.g., used for monitoring different ones of the storage arrays 106, or for monitoring jobs, tasks or other workloads from a different subset of the host devices 102, combinations thereof, etc.).

The host devices 102, the storage arrays 106 and the workload analysis system 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the storage arrays 106 and the workload analysis system 112 may be implemented on respective distinct processing platforms, although numerous other arrangements are possible. For example, in some embodiments at least portions of one or more of the host devices 102, the storage arrays 106 and the workload analysis system 112 are implemented on the same processing platform. One or more of the storage arrays 106 can therefore be implemented at least in part within at least one processing platform that implements at least a subset of the host devices 102 and/or the workload analysis system 112.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random-access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the workload analysis system 112 may be implemented at least in part in the first geographic location, the second geographic location, and one or more other geographic locations. Thus, it is possible in some implementations of the system 100 for different ones of the host devices 102, the storage arrays 106 and the workload analysis system 112 to reside in different data centers.

Numerous other distributed implementations of the host devices 102, the storage arrays 106 and the workload analysis system 112 are possible. Accordingly, the host devices 102, the storage arrays 106 and the workload analysis system 112 can also be implemented in a distributed manner across multiple data centers.

Additional examples of processing platforms utilized to implement portions of the system 100 in illustrative embodiments will be described in more detail below in conjunction with FIGS. 8 and 9.

It is to be understood that the particular set of elements shown in FIG. 1 for automated causal analysis of issues affecting workloads executing in an IT infrastructure is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
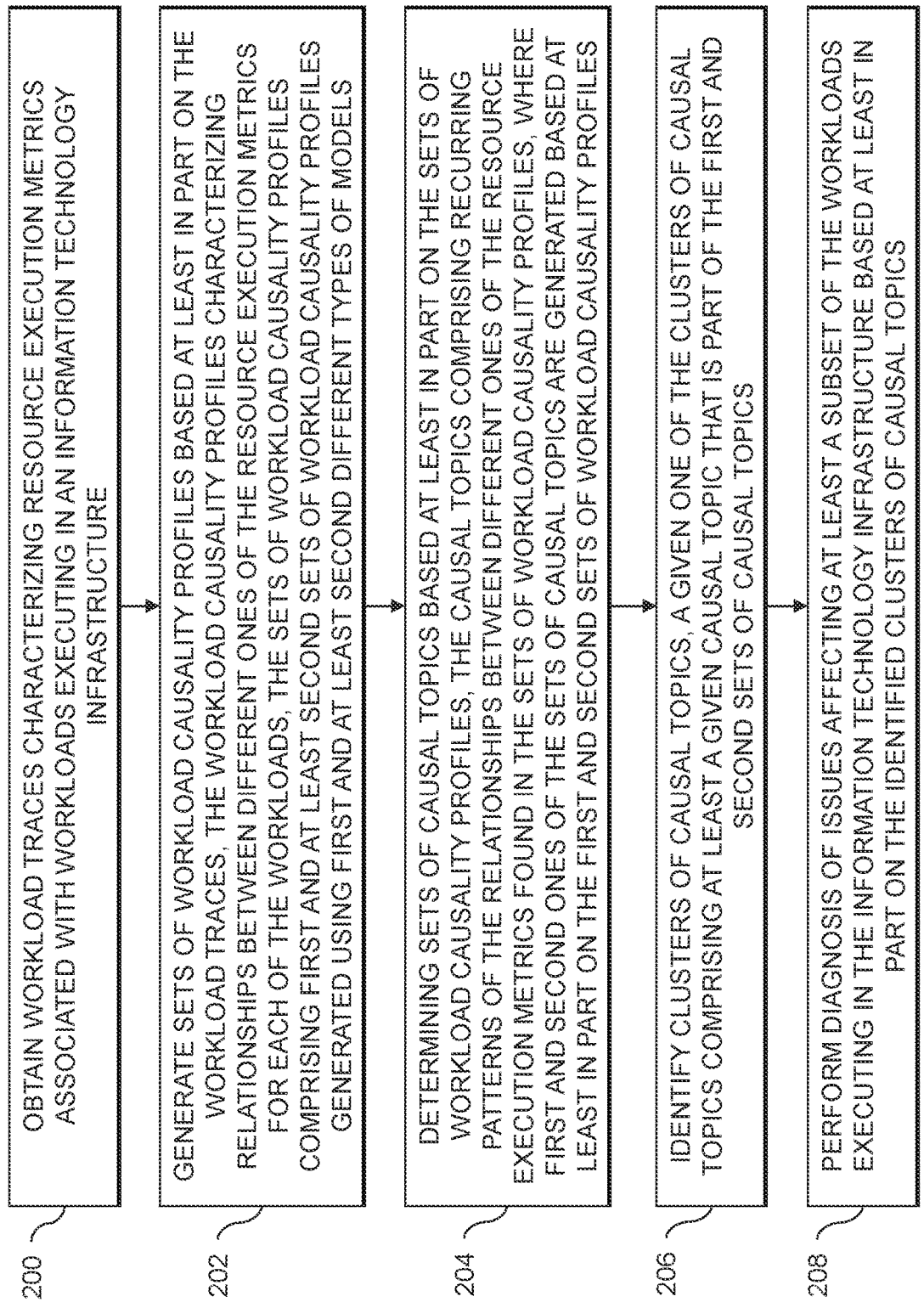
FIG. 2 is a flow diagram of an exemplary process for automated causal analysis of issues affecting workloads executing in an information technology infrastructure in an illustrative embodiment.

An exemplary process for automated causal analysis of issues affecting workloads executing in an IT infrastructure will now be described in more detail with reference to the flow diagram of FIG. 2. It is to be understood that this particular process is only an example, and that additional or alternative processes for automated causal analysis of issues affecting workloads executing in an IT infrastructure may be used in other embodiments.

In this embodiment, the process includes steps 200 through 208. These steps are assumed to be performed by the workload analysis system 112 utilizing the workload causality profile generation module 114, the causal topic determination module 116, and the causal topic clustering module 118. The process begins with step 200, obtaining a plurality of workload traces characterizing resource execution metrics associated with a plurality of workloads executing in an IT infrastructure. In step 202, two or more sets of workload causality profiles are generated for the plurality of workloads based at least in part on the plurality of workload traces. The workload causality profiles characterize relationships between different ones of the resource execution metrics for each of the plurality of workloads executing in the IT infrastructure. The two or more sets of workload causality profiles comprise a first set of workload causality profiles generated using a first type of model and at least a second set of workload causality profiles generated using a second type of model different than the first type of model. The first type of model may comprise a dependence measurement model and the second type of model may comprise a causal model. The dependence measurement model may comprise a Schweizer-Wolff dependence measurement model, and the causal model may comprise a Rubin causal model.

Two or more sets of causal topics are determined in step 204 based at least in part on the two or more sets of workload causality profiles. The causal topics comprise recurring patterns of the relationships between different ones of the resource execution metrics found in each of the two or more sets of workload causality profiles. A first one of the two or more sets of causal topics is generated based at least in part on the first set of workload causality profiles and at least a second one of the two or more sets of causal topics is generated based at least in part on the second set of workload causality profiles. Determining the two or more sets of causal topics in step 204 may utilize a topic model, wherein the workload causality profiles represent documents, the resource execution metrics represent words, and the causal topics comprise explanations for issues encountered during execution of the plurality of workloads in the information technology infrastructure. The topic model may comprise a Latent Dirichlet Allocation (LDA) topic model. The causal topics may comprise probabilities of two or more of the resource execution metrics being a cause of one or more issues encountered during execution of the plurality of workloads executing in the IT infrastructure.

In step 206, one or more clusters of causal topics are identified. The one or more clusters of causal topics each comprise at least one causal topic that is part of the first set of causal topics and the second set of causal topics. Identifying the one or more clusters of causal topics in step 206 may utilize an ensemble learning algorithm. The ensemble learning algorithm may utilize agglomerative hierarchical clustering.

Diagnosis of one or more issues affecting at least a subset of the plurality of workloads executing in the IT infrastructure is performed in step 208 based at least in part on the identified one or more clusters of causal topics. Performing the diagnosis of the one or more issues affecting at least the subset of the plurality of workloads executing in the IT infrastructure in step 208 may comprise determining explanations for the subset of the plurality of workloads violating one or more service level agreements (SLAs). The FIG. 2 process may further include modifying processing of one or more additional workloads executing in the IT infrastructure based at least in part on the diagnosis of the one or more issues affecting at least the subset of the plurality of workloads executing in the IT infrastructure.

In some embodiments, the resource execution metrics comprise two or more explanatory variable metrics and at least one response variable metric. The workload causality profiles may characterize relationships between each of the two or more explanatory variable metrics and the at least one response variable metric. The plurality of workloads may comprise backup operations executing in backup systems of the IT infrastructure, and the at least one response variable metric may comprise workload running time. The two or more explanatory variable metrics may comprise two or more of: backup operation type of the plurality of workloads executing in the backup systems of the IT infrastructure, stream consumption on the backup systems of the IT infrastructure; backup system model numbers of the backup systems of the IT infrastructure; backup system processor usage of the backup systems of the IT infrastructure; whether garbage collection processes are running on the backup systems of the IT infrastructure; network issues associated with the backup systems of the IT infrastructure; and amounts of write to storage devices of the backup systems of the IT infrastructure that exceed a designated threshold latency.

In modern data centers, multiple storage systems may be deployed to handle the massive amounts of the data that is generated by jobs, tasks or other workloads executing in the data centers (e.g., running on assets, such as physical and virtual computing resources, of an IT infrastructure). Managing such storage systems is a difficult task for end-users or operators of the data centers. End-users are looking for more intelligent and efficient solutions that can provide insights into problems or issues encountered in their storage ecosystems. While there are many different types of jobs, tasks or other workloads that may be conducted, various embodiments are described in detail below with respect to monitoring backup jobs, tasks or other workloads on storage systems (e.g., data ingestion, data replication, data migration, etc.). Conventional approaches do not provide any insights on why jobs, tasks or other workloads tend to show unexpected behavior. End-users need to manually search for the causes of problems. When dealing with large datacenters and massive amounts of data and associated jobs, tasks or other workloads involving that data, such manual approaches are not feasible.

Figure 3:
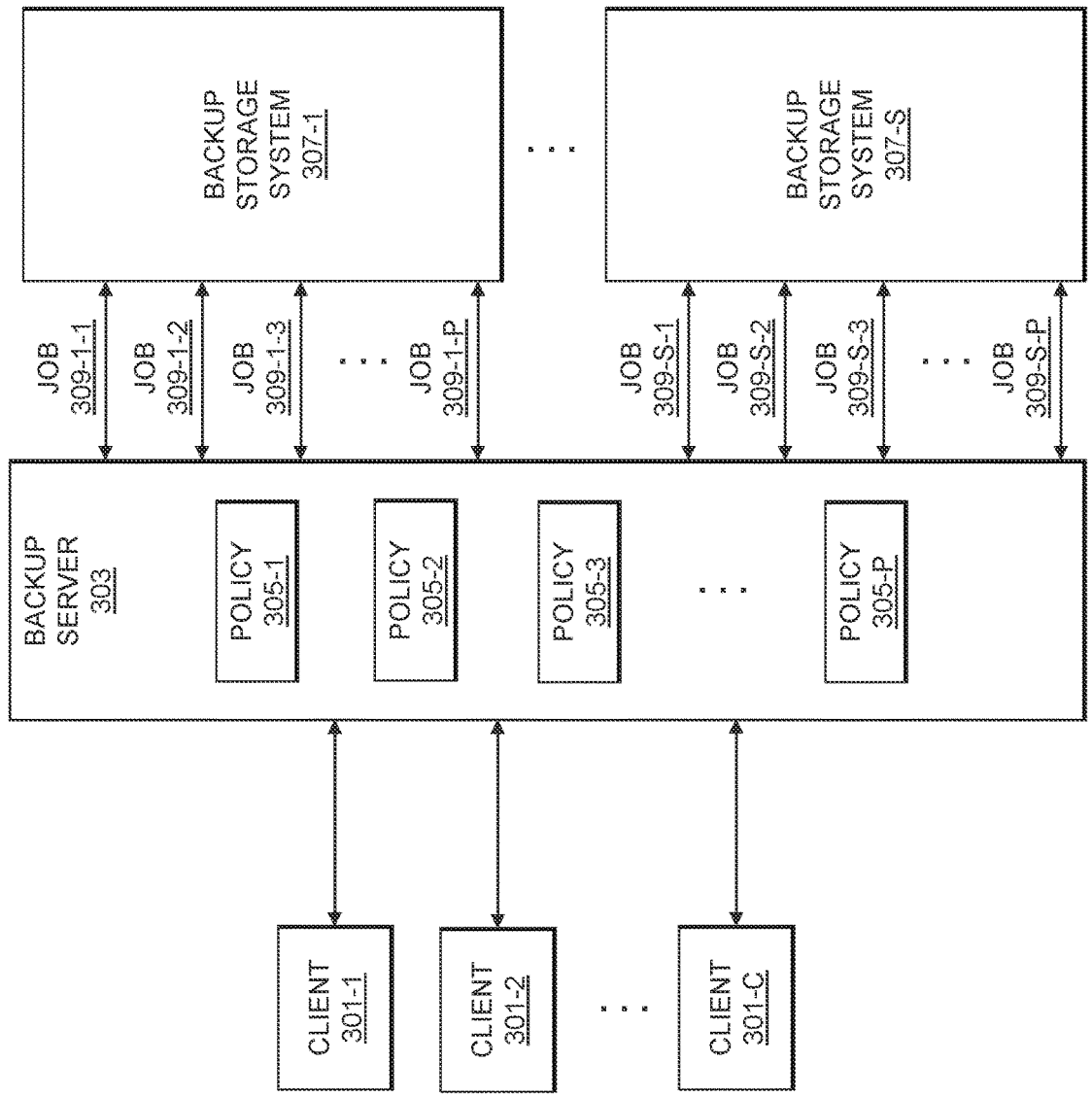
FIG. 3 shows a backup ecosystem running jobs from multiple clients across multiple backup systems in an illustrative embodiment.

FIG. 3 shows a backup ecosystem, which includes a set of clients 301-1, 301-2, . . . 301-C (collectively, clients 301) which run various jobs that are submitted to a backup server 303. It should be understood that the term "job" as used herein is intended to be construed broadly, and refers to any type of job, process, task or other workload. The backup server 303, which may implement a Dell EMC Avamar solution, performs backups for the different clients 301 in accordance with a set of policies 305-1, 305-2, 305-3, . . . 305-P (collectively, policies 305). Such backup operations are submitted from the backup server 303 to a set of backup storage systems 307-1, . . . 307-S (collectively, backup storage systems 307). The backup storage systems 307 may comprise or implement Dell EMC Data Domain solutions. As shown in FIG. 3, for example, a set of jobs 309-1-1, 309-1-2, 309-1-3, . . . 309-1-P (collectively, jobs 309-1) are submitted to backup storage system 307-1, and a set of jobs 309-S-1, 309-S-2, 309-S-3, . . . 309-S-P (collectively, jobs 309-S) are submitted to backup storage system 307-S.

End-users of the clients 301 trigger different operations or jobs 309-1, . . . 309-S (collectively, jobs 309) on the backup storage systems 307. The jobs 309 may comprise, for example, backup, restore and replication jobs. The number of such jobs 309 can increase depending on the number of backup storage systems 307 managed by the backup server 303. In the description below, the problem of determining why one or more of the jobs 309 is running for longer than usual on the backup storage systems 307 is taken as an example for clarity of illustration. Typically, there are SLAs defined for each job type, and end-users want the jobs 309 to be completed within these defined SLAs. The SLAs (e.g., policies 305) may vary from end-user to end-user (e.g., different ones of the clients 301) based on their backup environments and needs. For example, some clients 301 may specify a policy (e.g., policy 305-1) that backup jobs have 8-hour time windows (e.g., all backup operations should be completed within the 8-hour time window).

There can be various reasons for job completion times to go beyond defined SLAs of the policies 305. Conventional approaches for monitoring and handling jobs 309, however, do not provide sufficient intelligence and insights to the clients 301 for determining the reasons or causes for the job completion times going beyond defined SLAs of the policies 305. For example, if a given job runs for more time (e.g., beyond that defined in an associated SLA or other policy), no insights are provided to the end-user or client submitting that job as to why that job is running for more time. End-users have to manually review to determine underlying causes, such as using time-consuming trial-and-error methods. This is difficult to implement, particularly at scale in modern data centers.

In order to provide clear insights about unexpected behavior of jobs in storage systems (e.g., jobs 309 running on the backup storage systems 307), causal diagnosis is very important. Problems with conventional approaches to causal diagnosis, however, include that conventional approaches are highly labor intensive, fail to scale, rely on expertise and domain knowledge of human users, etc. Illustrative embodiments provide techniques which overcome these and other disadvantages of conventional approaches for causal diagnosis, through the use of automated causal analysis of resource execution metric behavior at scale in storage systems. The solutions described herein offer an end-to-end approach for automated causal diagnosis of resource execution metrics (e.g., determining why particular jobs are running longer than expected such as outside of SLAs or other defined policies). The solutions used in some embodiments consider various objectives, including storage systems scale insight, unbiased inference, interpretable models, and computational efficiency. Advantageously, the solutions used in some embodiments offer an unbiased causal diagnosis of unexpected behavior of jobs or other workloads using a hybrid ensemble approach, which intelligently handles the difficulty of causal diagnosis of problems at scale using a novel multi-step approach.

Figure 4:
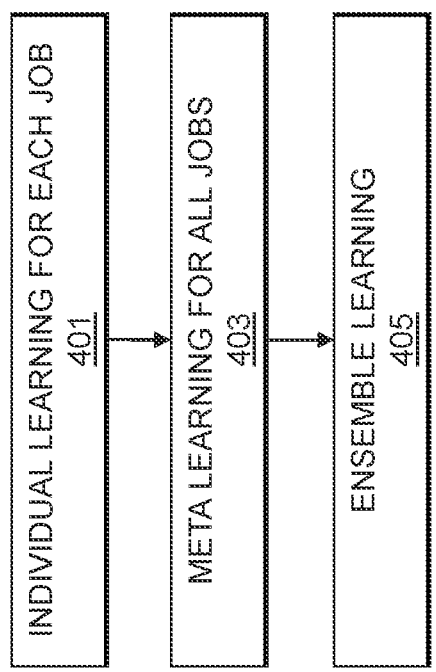
FIG. 4 shows a system flow of stages of learning used for automated casual analysis of issues affecting workloads executing in an information technology infrastructure in an illustrative embodiment.

In illustrative embodiments, end-to-end intelligent and efficient methods are provided through considering different objectives. For example, insights into issues encountered by jobs executing on storage systems at scale can be provided by constructing a model for each job, and then extracting patterns to infer recurring causes across all of the jobs. Unbiased inference is advantageously provided to reduce the risk of coming to the wrong conclusion. Unbiased inference may be provided, at least in part, through the use of multiple models (e.g., different types of models) to make sure that the different models produce the same cause and same explanation. Interpretable models advantageously ensure that results can be easily interpretable by end-users. Further, the solutions described are computationally efficient (e.g., an efficiency of O(N), where N is the number of jobs). FIG. 4 illustrates different steps or stages of the solution, which include a first step or stage 401 where individual learning is performed for each of a set of jobs, a second step or stage 403 where meta learning is performed for the set of jobs, and a third step or stage 405 where ensemble learning is performed to provide overall insights as described elsewhere herein.

Figure 5:
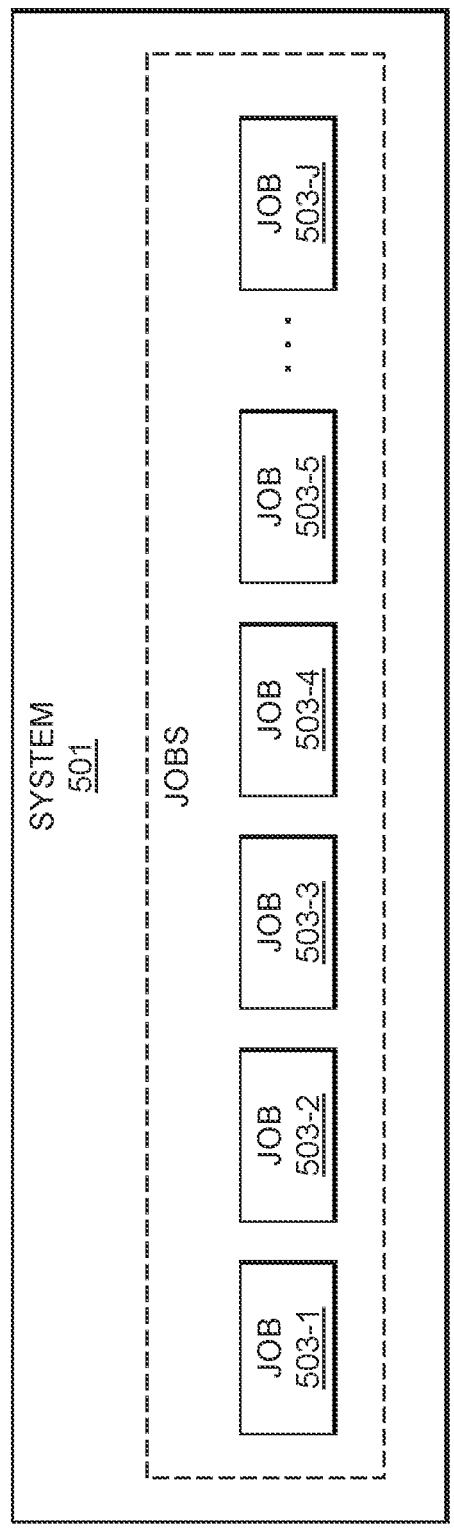
FIG. 5 shows a set of jobs running on a system in an illustrative embodiment.

In stage 401, individual learners are used for each job to figure out the relationships between different explanatory variables and at least one response variable. In the description below, it is assumed that the response variable is job running time. Since using a single learner or single model can induce bias and lead to false causes, some embodiments utilize an ensemble of multiple learners or models to discover dependence and causal relationships between the explanatory and response variables. FIG. 5 illustrates a system 501 (e.g., a storage system) which runs different jobs 503-1, 503-2, 503-3, 503-4, 503-5, . . . 503-J (collectively, jobs 503).

Various job tracing profiles may be defined for different job types (e.g., backup, restore, replication, etc.), where the job tracing profiles define various explanatory variables that may impact the final response variables. The explanatory variables for each job type can be predefined by an engineering team or subject matter expert, as domain expertise and an understanding of the overall system architecture is helpful for understanding what types of explanatory variables can impact the response variables (e.g., job running time). While various embodiments are described below with respect to job running time as the response variable, various other response variables may be used in other embodiments. Consider, for example, using the solution described herein for analyzing the cause of high storage IO response time or lower throughput. If the appropriate explanatory variables are defined, then the reasons for such high storage IO response time or lower throughput can be identified using the techniques described herein.

Figure 6:
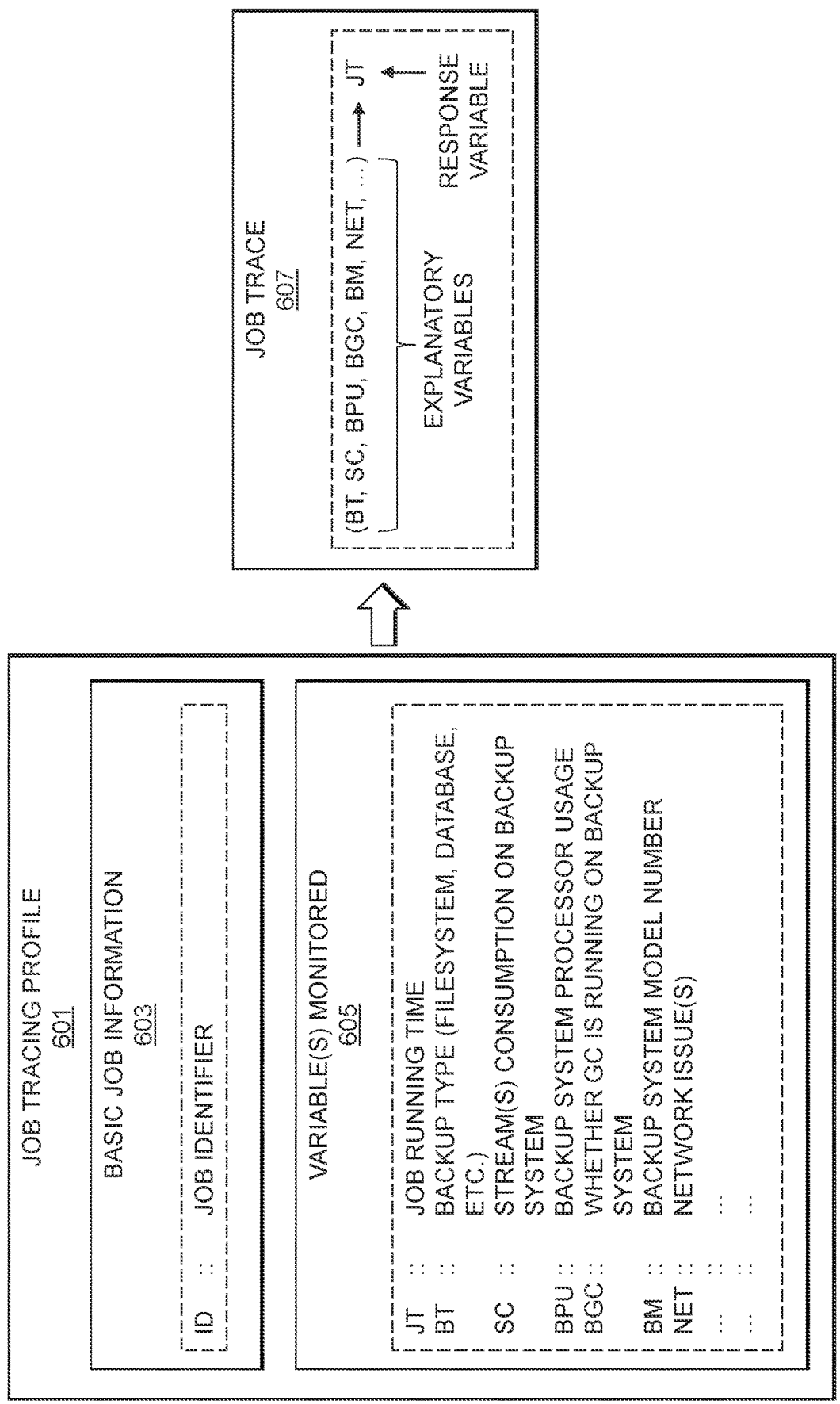
FIG. 6 shows a job tracing profile and associated job trace in an illustrative embodiment.

FIG. 6 shows an example of a job tracing profile 601, which defines basic job information 603 and variables to be monitored 605. FIG. 6 also shows an example of a job trace 607 produced using the job tracing profile 601. In the FIG. 6 example, the basic job information 603 includes a job identifier (ID), and the monitored variables 605 include: job running time (JT); backup type (BT), where the backup type may be backup of a filesystem, database, etc.; streams consumption (SC) on the backup system; backup system processor usage (BPU); whether garbage collection (GC) is running on the backup system; backup system model number (BM); network issues (NET); etc. The resulting job trace 607 shows that JT is the response variable, and that BT, SC, BPU, BGC, BM, NET, etc. are the explanatory variables. The various explanatory variables shown in the example job tracing profile 601 of FIG. 6 will now be described in further detail:

BT—it is known that the time taken for backup jobs for filesystem workloads and database or other application workloads are different (e.g., database backups may involve backing up transaction data as well, and thus typically take longer when compared to filesystem backups), and thus BT is considered as a variable that can impact job completion time;

SC—backup systems typically support a limited number of streams for each operation (e.g., writes, reads, etc.) and hence if the backup system is already consuming the full number or amount of supported streams, any new write operations need to be in a queued state until streams are released or freed up, such that SC is considered as a variable that can impact job completion time;

BM—backups running on older model systems are typically slower due to such older model systems tending to have lower memory and processor power;

BPU—if the backup system processor usage is at or near full, then it is likely that backup jobs will slow down;

BGC—garbage collection (GC) is an expensive process that needs higher amounts of resources, and thus can slow down any running backup operations on a backup system;

NET—network issues are a common or primary reason for slowdown of backup jobs, and may be the result of failing network components, bad connection, bandwidth issues, etc.

It should be appreciated that the particular explanatory variables described above are presented by way of example, and that embodiments are not limited solely to use with these specific variables. In other embodiments, various other types of explanatory and response variables may be utilized in addition to or in place of one or more of the above-described explanatory and response variables. As one example, high write latencies to underlying disks (WLAT) is another possible explanatory variable which may be utilized. High write latencies to underlying disks can occur due to various reasons on the backup systems, and thus can eventually lead to poor write performance which can affect job completion time. Any other variables that are determined to be likely to impact response variables (e.g., such as job completion or running time JT) can be pre-selected for job tracing profiles used for different job types.

Various explanatory variables include metrics that are already captured in job logs, and the algorithm can directly use such metrics for the explanatory variables. The NET explanatory variable, for example, can include various subclasses or sub-variables. For example, some embodiments may consider only the delay in the network that results in delayed job runs. Other embodiments may consider other types of network issue variables. Depending on the end-user environment, the NET variable (and possibly other ones of the above-described explanatory variables) may be broken down into multiple variables. For example, in the context of job failure problems, the NET variable may be a determination of when the destination system is not reachable.

Figure 7A:
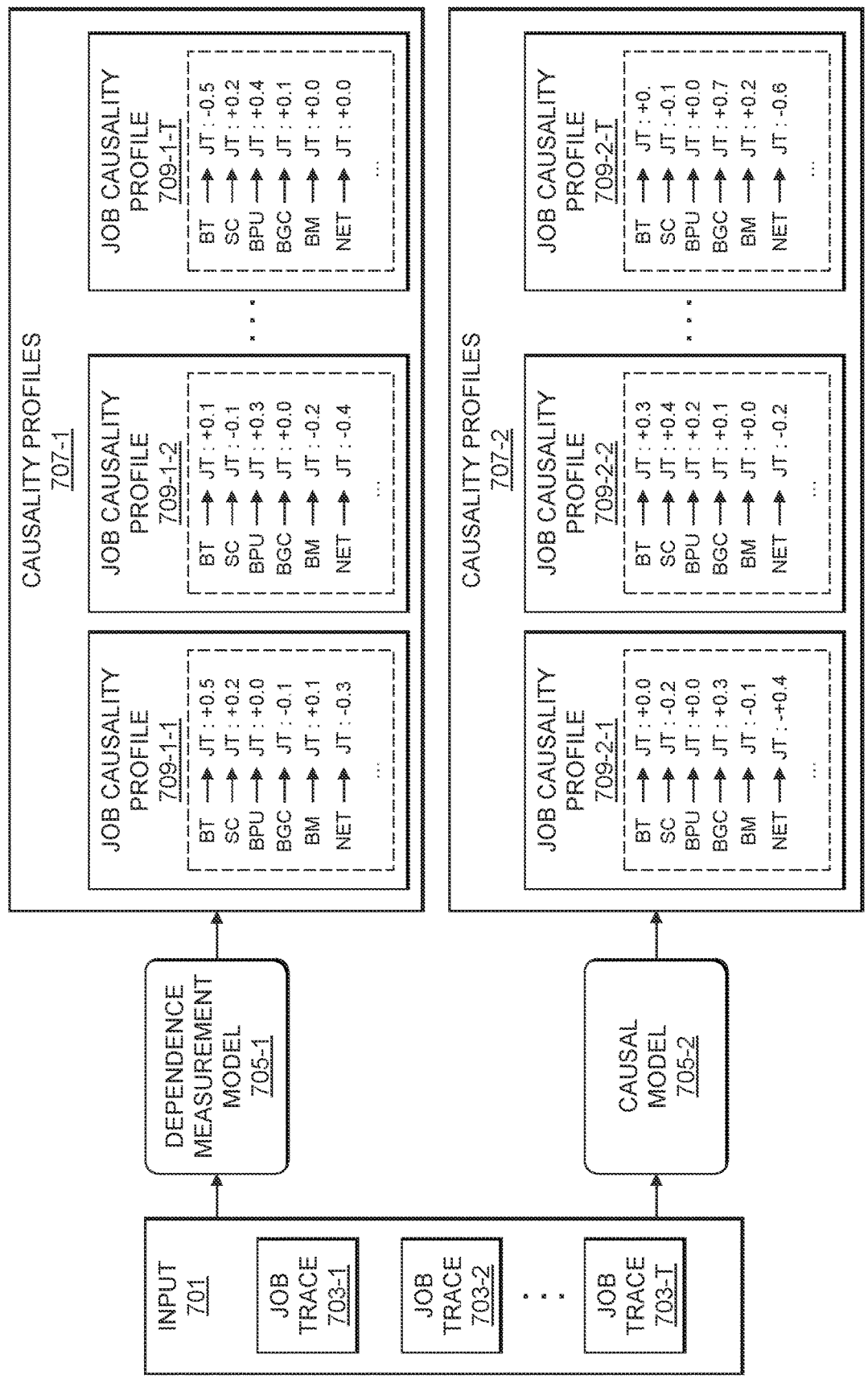
FIGS. 7A through 7G illustrate stages of learning used for automated causal analysis of issues affecting workloads executing in an information technology infrastructure in an illustrative embodiment.

In order to obtain relationships between explanatory and response variables, some embodiments utilize multiple models, such as a dependence measurement model and a causal model. FIG. 7A shows an example of use of such different models, where input 701 comprising job traces 703-1, 703-2, ... 703-T (collectively, job traces 703) are submitted to both a dependence measurement model 705-1 and causal model 705-2 (collectively, models 705) to produce different sets of causality profiles 707-1 and 707-2 (collectively causality profiles 707). Each of the causality profiles 707 is assumed to comprise a set of job causality profiles (e.g., one for each of the job traces 703). For example, causality profiles 707-1 produced by the dependence measurement model 705-1 include job causality profiles 709-1-1, 709-1-2, ... 709-1-T (collectively, job causality profiles 709-1) and causality profiles 707-2 produced by the causal model 705-2 include job causality profiles 709-2-1, 709-2-2, ... 709-2-T (collectively, job causality profiles 709-2). The job causality profiles 709-1 and 709-2 (collectively, job causality profiles 709), as illustrated in FIG. 7A, show the relationships between the explanatory and response variables. More particularly, the job causality profiles 709-1 illustrate dependence between the explanatory and response variables determined using the dependence measurement model 705-1 while the job causality profiles 709-2 illustrate causal effect between the explanatory and response variables determined using the causal model 705-2.

There are many different types of models which may be used as the dependence measurement model 705-1. In some embodiments, the dependence measurement model 705-1 is implemented using a Schweizer-Wolff model, which provides good accuracy. The Schweizer-Wolff model measures or identifies the dependence between two variables, X and Y. There are two pieces of information, marginals and dependence, for the joint distribution of X and Y.

Dependency is described by Copula C by the Sklar theorem which separates two pieces of information (e.g., marginals and dependence). The Schweizer-Wolff model transforms variables using their cumulative distribution functions $F_X$ and $F_Y$ to obtain $u=F_X(x)$ and $v=F_X(y)$. The variables are increasingly dependent as the distance between C(u, v) and u*v grows. This distance is measured as follows:

$$\text{Schweizer} - \text{Wolff Measure } (X, Y) = \frac{12}{N^2 - 1} \sum_{i=1}^{N} \sum_{j=1}^{N} |\hat{c}(u_i, v_j) - u_i * v_j|$$

$$\hat{c}(u_i, v_j) = \frac{\text{\# of } (x_k, y_k) \text{ s.t. } x_k \leq x_i \text{ and } y_k \leq y_j}{N}, k \in [1, N]$$

where $(x_1, y_1)$, $(x_2, y_2)$, ... are observed pairs of X, Y.

Causal models, such as causal model 705-2, are used for extracting the relationship between the explanatory and response variables. Choosing the right causal model, however is important as the relationship between the explanatory and response variables can be explained by a third type of variable known as "confounding bias." For example, job completion times are mostly higher when run on older processors, but slower memory is confounding—it is possible to observe job completion times that are higher when running on systems with older processors, but it cannot be definitively stated that it is the older processor that gives poor performance because oftentimes systems with older processors also have slow memory. Thus, the question is whether the job completion time is being impacted due to the processor design or the memory of the system. This is the issue with confounding bias. To handle this efficiently, some embodiments implement the causal model 705-1 using a Rubin causal model. The Rubin causal model is often used in medical research (e.g., to determine if quitting smoking can reduce the risk of heart disease by some percentage), but is rarely seen or used in the computer science field.

The Rubin causal model formally estimates the effect of an explanatory variable (e.g., referred to as a treatment variable in the Rubin causal model) on a response variable while controlling all of the other confounding variables. These estimates are provided in the form of probabilities. Let X be an explanatory variable, Y be the response variable, and Z be the confounding variable. The Rubin causal model estimates the causal effect of X on Y while controlling Z. The Rubin causal model estimates the causal effect, Δ, which is different in responses with and without the treatment (e.g., $Y_1 - Y_0$) for each job:

$$\Delta = E(Y_1 - Y_0) = E(Y_1) - E(Y_0)$$

An inverse probability weighting method is used to estimate Δ, and estimates the effect despite missing data. For each data point, the treatment is either applied or not and the outcome is either $Y_1$ or $Y_0$. The data cannot report outcomes with and without treatment:

$$\Delta = E\left[\frac{XY}{e(Z)}\right] - \left[\frac{(1-X)Y}{1-e(Z)}\right]$$

where $e(Z)=P\{X=1|Z\}$ is the conditional probability of having a treatment X given values of confounding metrics Z.

As shown in FIG. 7A, the job causality profiles 709-1 and 709-2 produced by the different models 705-1 and 705-2 for each job trace 703 tells the relationship between various explanatory variables and the response variables (e.g., where the response variable is assumed to be the job running time, JT). The values obtained in the job causality profiles 709 can be viewed as regression coefficients. Bigger coefficients mean a larger effect, where a positive correlation (+) means there is a positive association between variables and a negative (−) correlation means there is a negative association between variables.

Using the models 705, it is possible to successfully obtain the relationships between explanatory and response variables. As multiple models 705 are used, this leads to a larger number of resulting sets of causality profiles 707 each including a number of job causality profiles 709 when there are a large number of jobs running on storage systems which produce job traces 703, and hence this approach does not scale well. In order to handle this, some embodiments utilize meta learning for all jobs in the second stage 403.

Figure 7B:
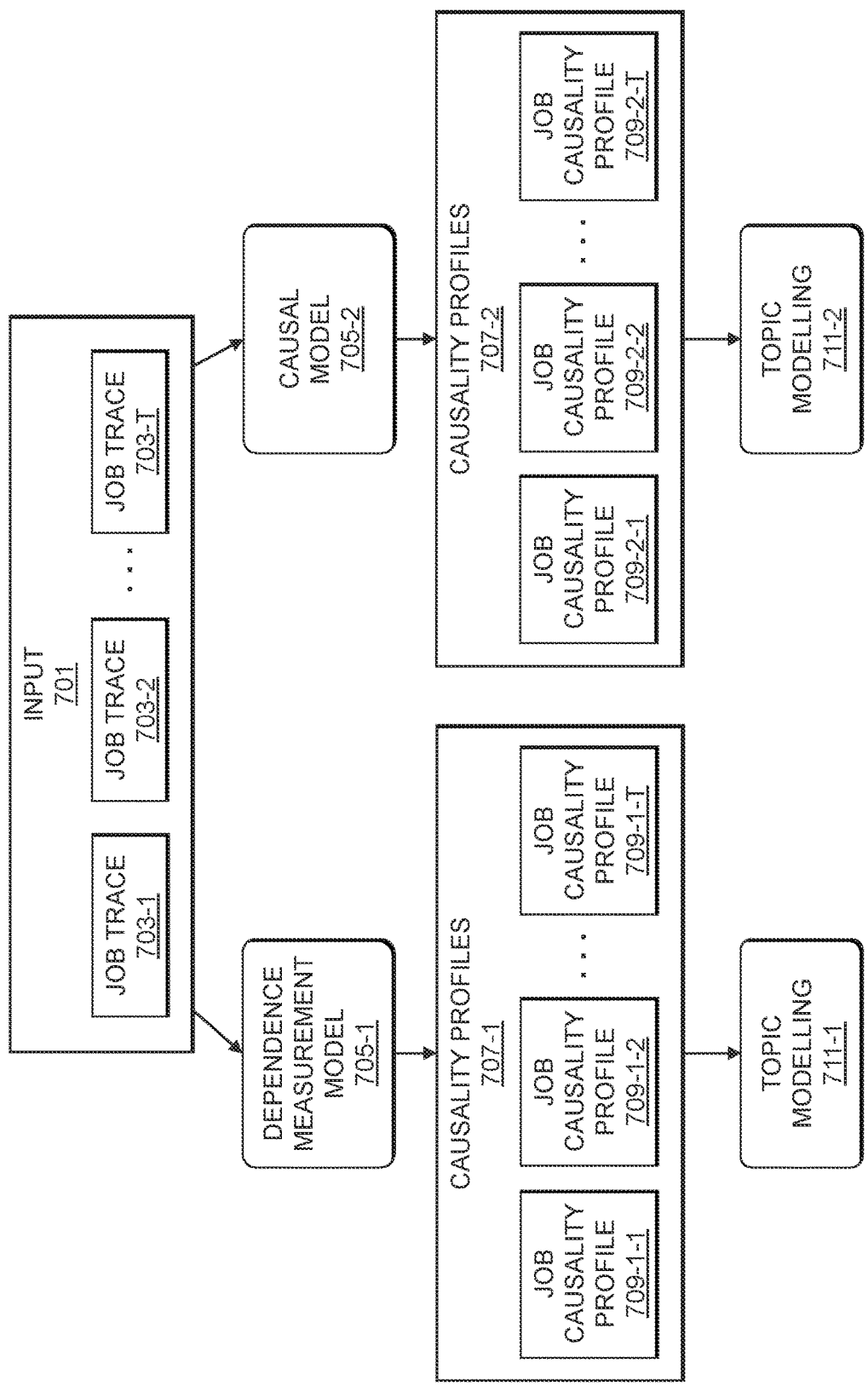

During the second stage 403, meta learning is performed for all jobs to identify recurring patterns across the models 705. As illustrated in FIG. 7B, topic modelling 711-1 and 711-2 (collectively, topic modelling 711) is performed on the causality profiles 707-1 and 707-2 output by the models 705-1 and 705-2. In some embodiments, the topic modelling 711 utilizes a probabilistic topic model such as an LDA topic model. LDA treats the base learners as documents (e.g., the outputs of the base learners, such as models 705, may be in the form of text files), with the explanatory variable conditions as words and causal explanations as topics. Because of the parallels between inferring themes in documents, the topic modelling 711 is able to identify patterns in causality. Here, the job causality profiles 709 are considered as "documents" and the topic modelling 711 looks at the effects as words within the document. For example, utilization of all supported storage streams on a backup system can result in a long running backup job. By treating the job causality profiles 709 as documents and the effects in the job causality profiles 709 as words, topic models can be constructed to identify when different words appear together. For example, high processor utilization often appears with garbage collection (GC) running, which may tell us something about the effect on running jobs. With topic modelling 711, recurring clusters of words (e.g., effects) are identified to determine or identify causal topics.

Figure 7C:
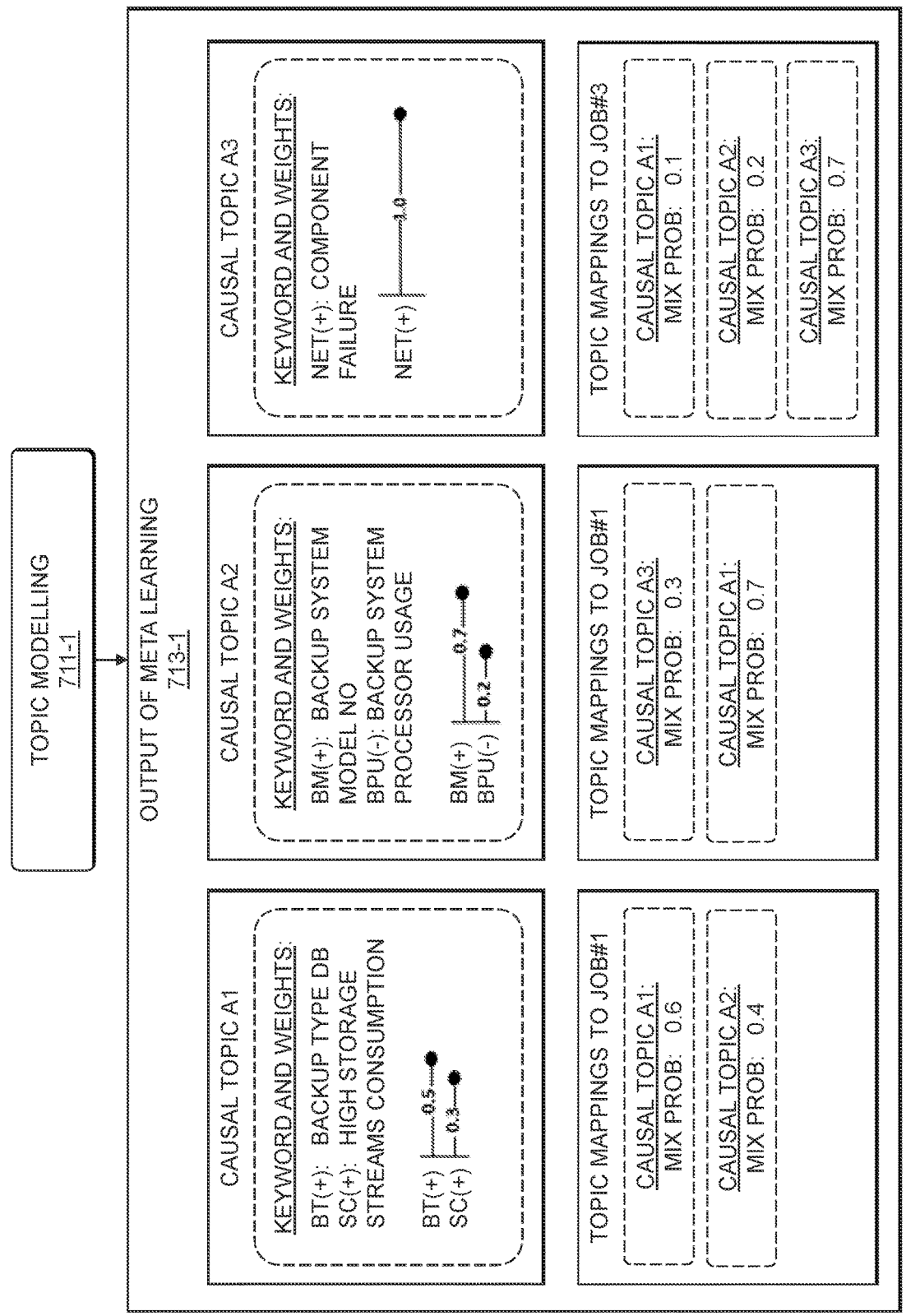

FIG. 7C shows an example of the output of meta learning 713-1 produced using the topic modelling 711-1 on the causality profiles 707-1 produced by the dependence measurement model 705-1. The output 713-1 includes a set of causal topics A1, A2, A3, . . . Ax, as well as topic mappings to particular jobs (associated with different job traces 703). Metrics (+), (−) indicate atypically high or low values. Once the causal topics A are identified, they can be mapped to each job based on the recurring words (e.g., effects) identified from each of the job causality profiles 709-1. This mapping can help point to the cause of long running jobs (e.g., jobs running longer than their associated SLAs or other policies). For example, as shown in FIG. 7C, the cause of job #1 running long beyond associated SLAs is 60% from causal topic A1 and 40% from causal topic A2. The final output of the meta learning stage 403 enables interpretable diagnosis. Once the causal topics are determined and which describe various variables, the causal topics and topic mappings can be analyzed to clearly see the causes for a given problem.

Figure 7D:
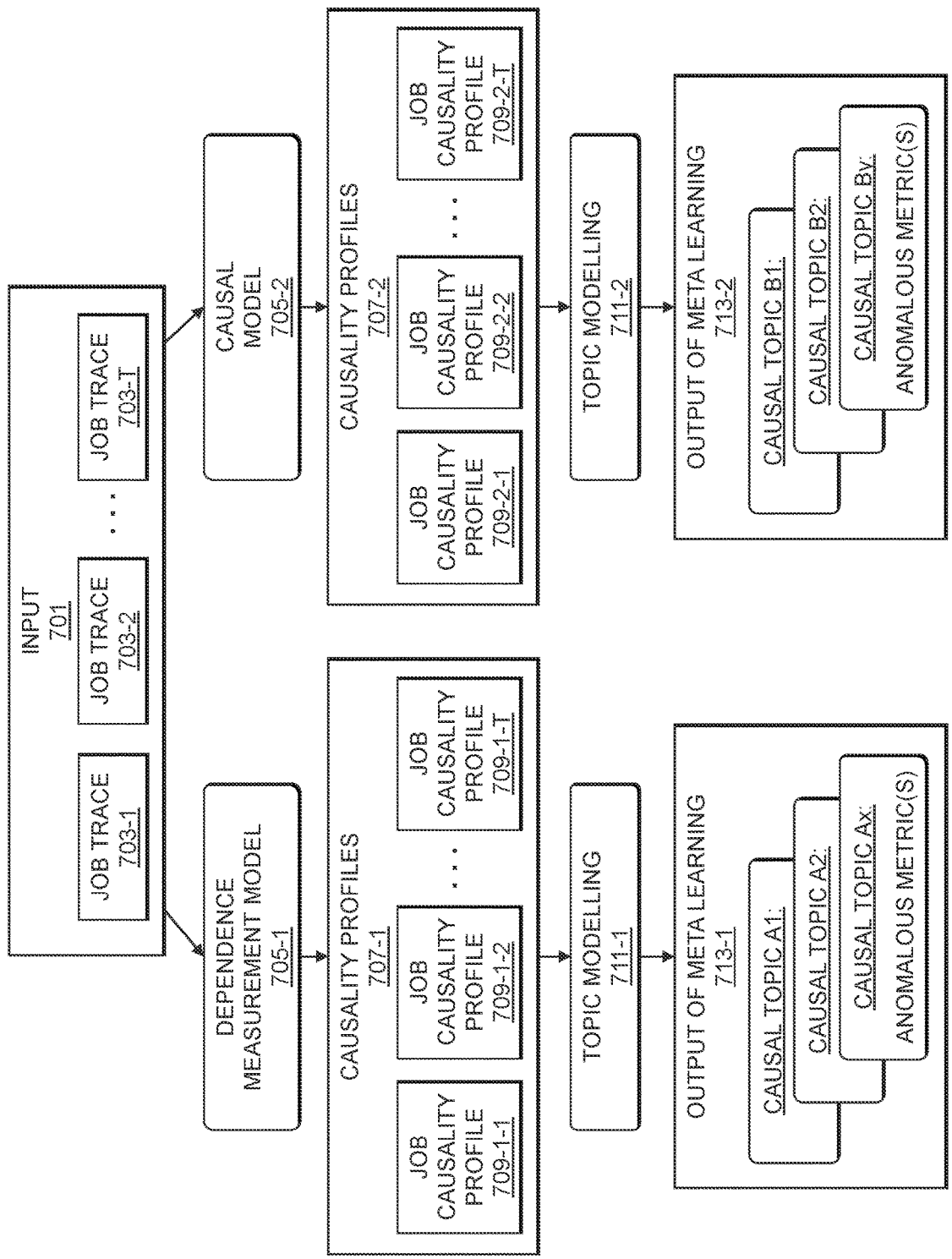

FIG. 7D shows the output of meta learning 713-1 and 713-2 (collectively, outputs of meta learning 713) for the topic modelling 711-1 and 711-2 (collectively, topic modelling 711) performed on the causality profiles 707-1 and 707-2 produced by the models 705-1 and 705-2. The output of meta learning 713-1 includes causal topics A1, A2, . . . Ax (collectively, causal topics A) and the output of meta learning 713-2 includes causal topics B1, B2, . . . By (collectively, causal topics B).

Figure 7E:
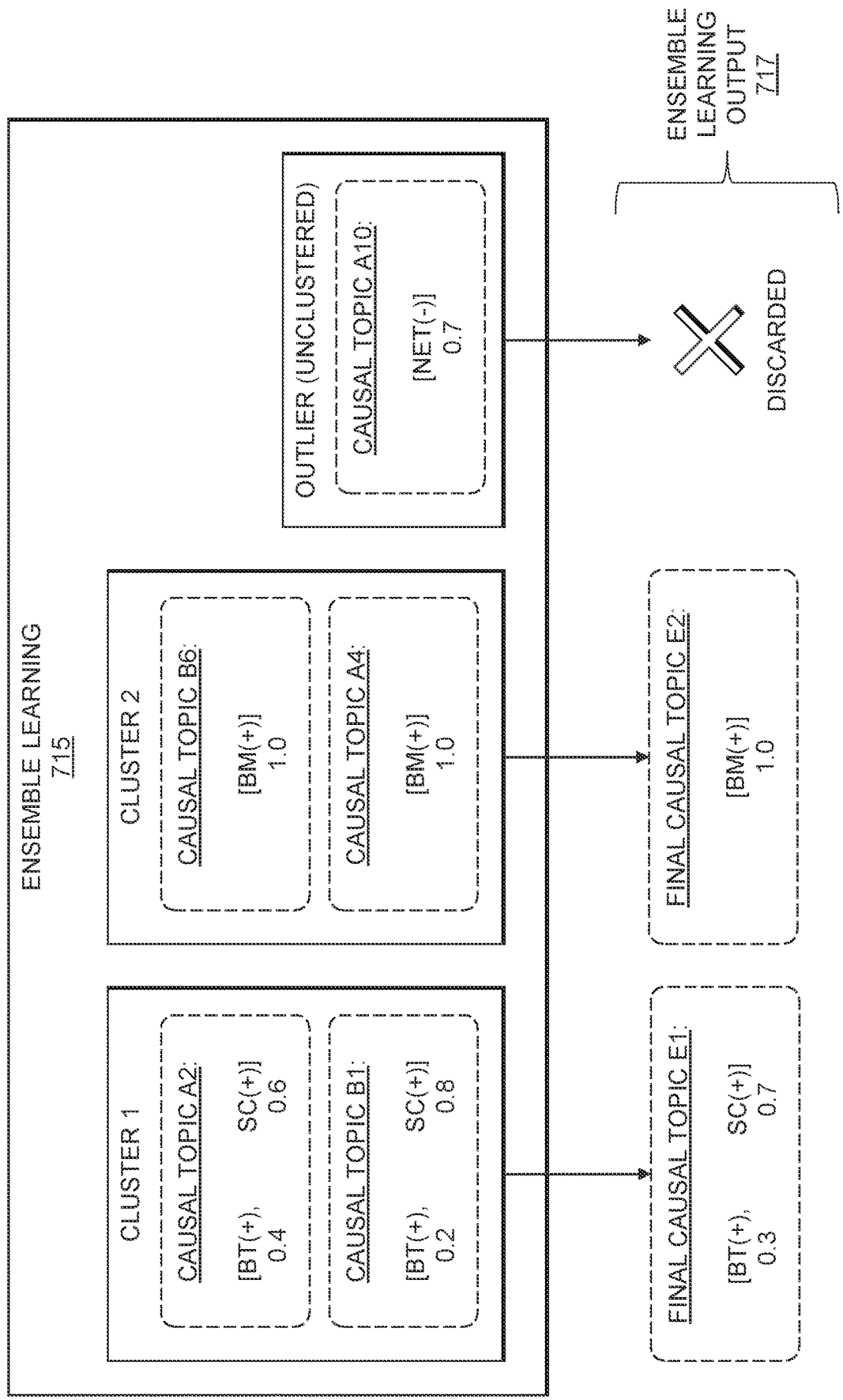

To guard against the bias of individual learners, and to avoid the situation of false explanations to a given problem, ensemble learning is performed in stage 405. FIG. 7E illustrates performance of ensemble learning 715 and ensemble learning output 717. In ensemble learning 715, topics constructed from each of the models 705 (e.g., the outputs of meta learning 713) are analyzed to construct clusters for topics that are reported by both of the models 705. In some embodiments, the ensemble learning 715 implements Agglomerative Hierarchical Clustering. As shown in FIG. 7E, the causal topics A2 and B1 are clustered into Cluster 1, as the same explanations are obtained by both models 705-1 and 705-2. Similarly, topics B6 and A4 are clustered into Cluster 2. FIG. 7E also shows a topic A10 (produced by the dependence measurement model 705-1) which talks about network issues (NET). At the end of the analysis, because this topic is identified as an orphan (e.g., it is not reported by the causal model 705-2), this is considered as unlikely to be a real explanation and is discarded. In this way, the ensemble learning 715 ensures that explanations for a given problem are not biased by a single one of the models 705. It should be noted that while some embodiments are described with respect to use of just two models (e.g., 705-1 and 705-2), in other embodiments more than two models can be utilized. The ensemble learning 715 in such embodiments may require that explanations provided for a given problem are provided by at least a threshold number of the multiple models (e.g., by at least two models, by some proportion or percentage of the total number of models, by at least one model of each of two or more different model types, etc.).

Figure 7F:
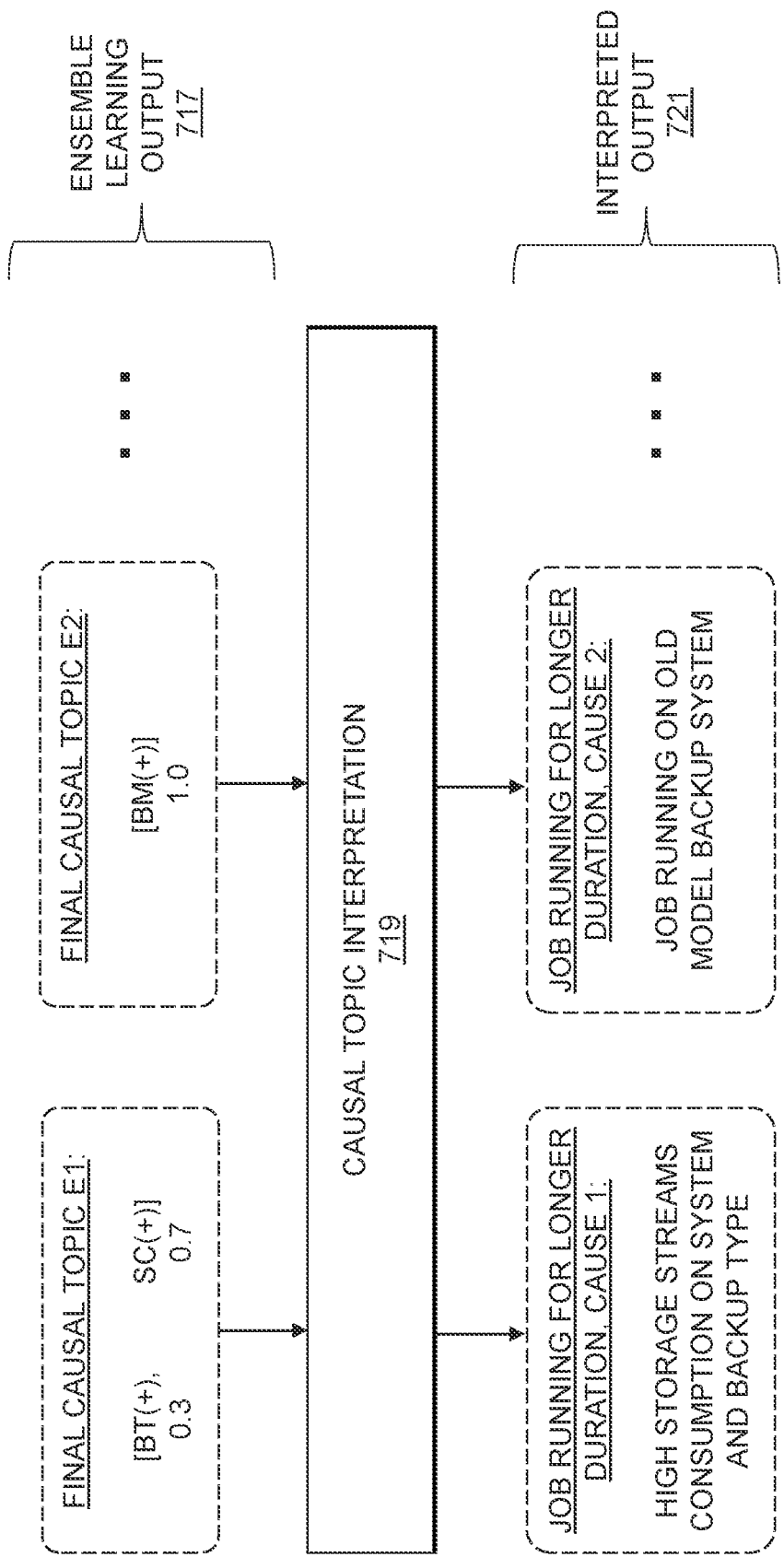
Figure 7G:
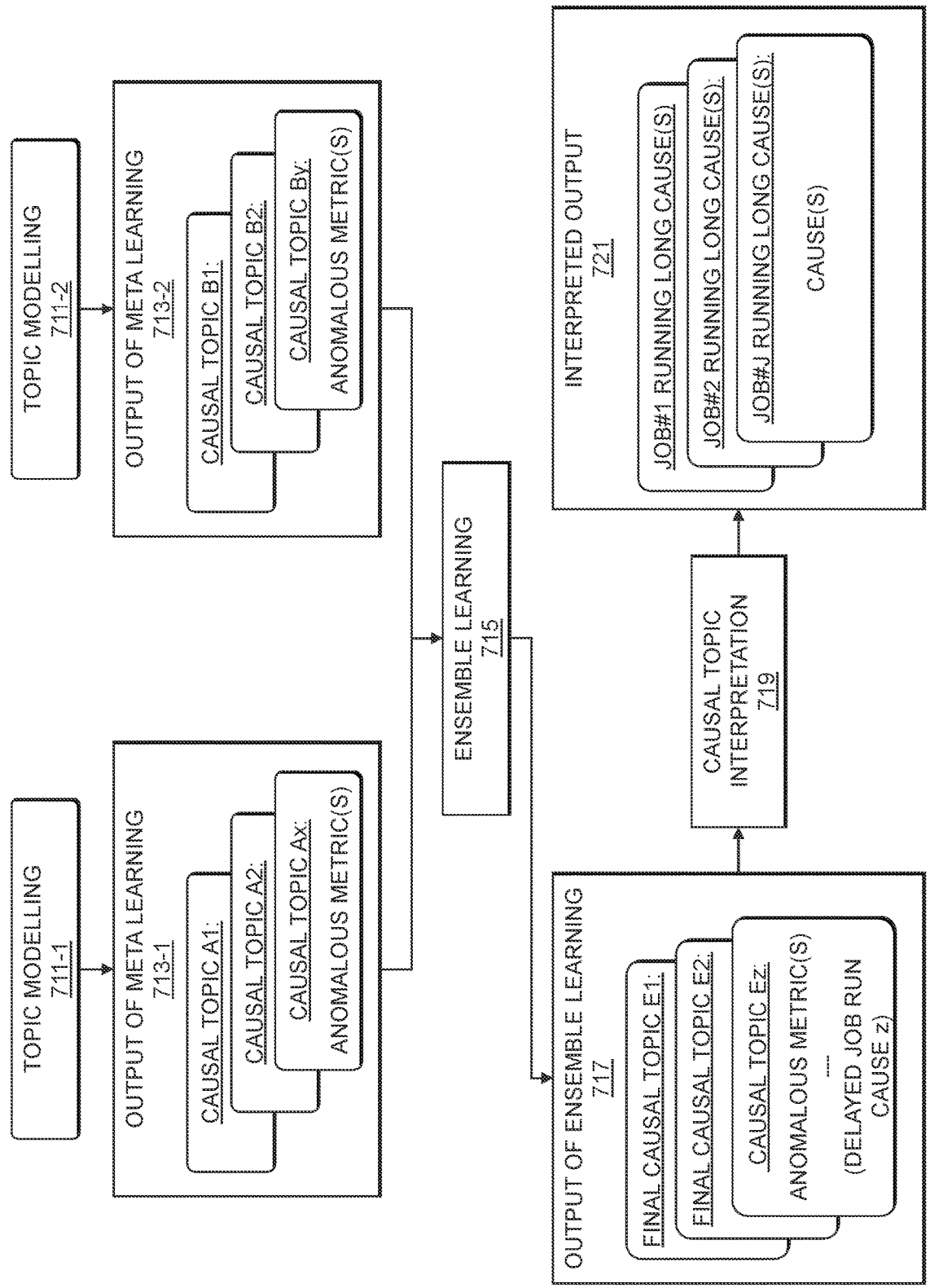

FIG. 7F illustrates causal topic interpretation 719 performed using the ensemble learning output 717. The causal topic interpretation 719, which may be performed at least in part by end-users such as domain knowledge experts, produces interpreted output 721 clearly showing the causes for a given problem (e.g., jobs running for longer duration than that specified by SLAs or other policies). FIG. 7G shows another view, illustrating an overall view of the process from topic modelling 711 through the interpreted output. In the example of FIGS. 7A-7G, the input 701 through causality profiles 707 represents the first stage 401 (e.g., individual learners), while the topic modelling 711 and outputs of meta learning 713 represent the second stage 403 (e.g., meta learning), and the ensemble learning 715 through the interpreted output 721 represents the third stage 405 (e.g., ensemble learning). Thus, FIGS. 7A-7G illustrate an endto-end intelligent system that provides unbiased inference on causal diagnosis of issues associated with resource execution metrics at scale.

Advantageously, the solutions described herein can be utilized to perform diagnosis of problems at a datacenter scale. For example, if an end-user is performing backups of a VMware vCenter® environment where there are thousands of VMs that need to be backed up, not all of such backups may succeed or complete within a time window specified by one or more SLAs or other policies. In this situation, the techniques described herein may be used to perform diagnosis of problems encountered and which result in such backup not succeeding or completing within the specified time window. The techniques described herein can give the causes for the jobs running for longer durations, causes for jobs failing, etc., for thousands of jobs at datacenter scale. Conventional approaches are not able to provide such a solution, and instead rely on end-users manually checking each job to identify the causes. Also, in some cases identifying the causes of issues is not easy using the raw logs. For example, logs many times include only generic failure messages (e.g., "write to DataDomain failed"). The solutions described herein can help end-users to understand the underlying causes of job problems, and allows for efficient handling of issues to overcome or prevent them in the future.

Once the causes are identified for a given problem, end-users can use this for decision making such that future jobs will not be impacted with these reasons to the extent possible. This can be automated through the use of a decision-making engine (e.g., which may use A/B testing, multi-armed bandit methods, etc.) to make optimal decisions. For example, if the primary cause for job failures is identified as insufficient storage space on the destination storage system, then the decision-making engine can select an optimal action from a set of possible actions. In this case, the optimal action can be to retry the jobs on another storage system.

Knowing the underlying causes for a given problem or issue with jobs or workloads (e.g., delayed job runs, job failures, etc.) at scale is a difficult task, and illustrative embodiments provide a hybrid algorithm for accomplishing this. Consider, for example, end-users protecting VMs located in a data center (e.g., where there may be thousands of VMs). In such a case, there may be many failed jobs, or jobs which run longer than expected as defined by SLAs or other policies. In such a situation, it is very difficult for end-users to check for the underlying causes for each job separately, and thus the end-users may be interested in performing causal analysis for all of the jobs to determine the reasons behind problems or issues.

Typically, when considering identification of the underlying cause, causal analysis is performed. Causal analysis may be feasible to perform for a single job, or a few jobs. Difficulties arise, however, when causal analysis need to be performed at scale for a large number (e.g., potentially hundreds or thousands of jobs). A statistical model makes assumptions that prevent it from performing well for all data sets. Thus, relying on a single method or model is risky when analyzing large, heterogeneous datasets such as job logs for backup systems. Thus, illustrative embodiments provide solutions for handling causal analysis at scale by performing meta learning and using ensemble learning to reduce the risk of biased conclusions.

Advantageously, embodiments provide interpretable models. Most widely used models are difficult to interpret. For example, regression trees often produce large models from small datasets. Such models may be able to generate accurate predictions, but cannot produce generalizable insight. The solutions described herein ensure interpretability with topic models. LDA used for topic modelling in some embodiments identifies features that often appear together in jobs' causal profiles. Further, illustrative embodiments advantageously provide computationally efficient approaches. The computational complexity of designing a model for job analysis may depend on: (1) the number of metrics to be monitored (e.g., explanatory variables); and (2) the number of jobs. The solutions described herein utilize learning methods that have polynomial complexity, and can run in parallel in distributed systems. Thus, the solutions described are computationally "cheap" as compared with inference models such as Bayesian networks.

For a given problem or issue, the general causal variables (e.g., explanatory variables) may be identified by a system or domain expert and hence are expected to be correct selections. This is a one-time task for a given problem or issue (e.g., for delayed jobs a first set of explanatory variables can be identified, for failed jobs a second set of explanatory variables can be identified, etc.). Following this one-time activity, whenever the algorithm is triggered to perform the causal analysis, it automatically identifies the recurring causes of a given problem or issue. There is no need for human interruption or input every time the algorithm is triggered.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automated causal analysis of issues affecting workloads executing in an IT infrastructure will now be described in greater detail with reference to FIGS. 8 and 9. Although described in the context of system 100, these platforms may also be used to implement at least portions of other information processing systems in other embodiments.

Figure 8:
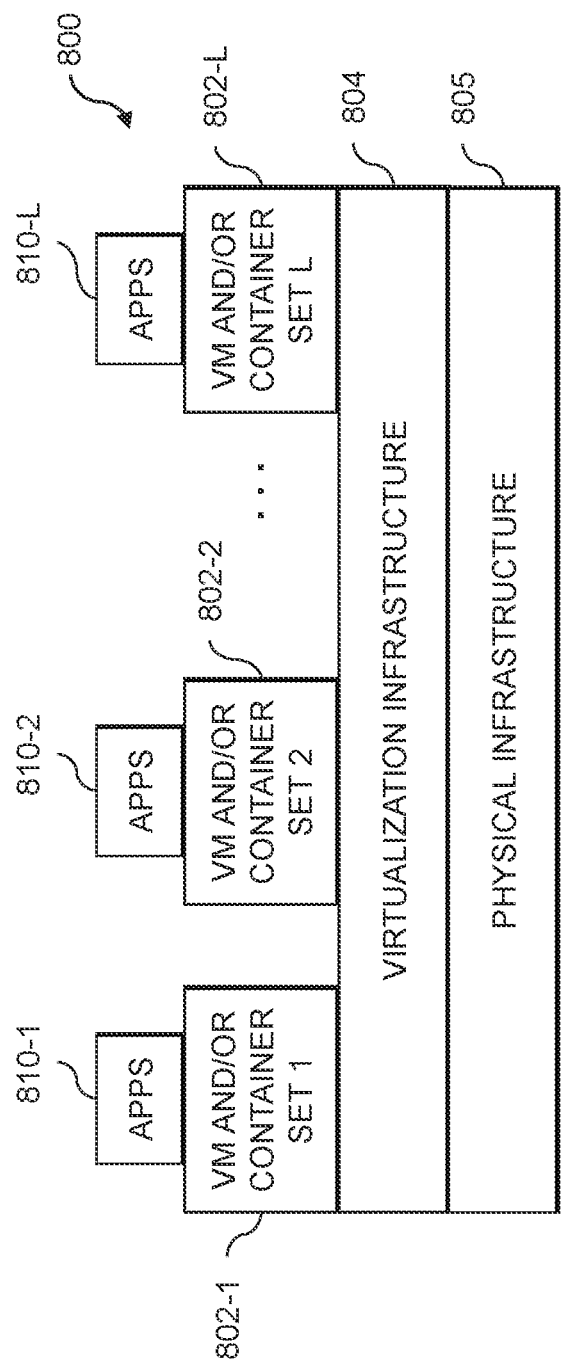
FIGS. 8 and 9 show examples of processing platforms that may be utilized to implement at least a portion of an information processing system in illustrative embodiments.
Figure 9:
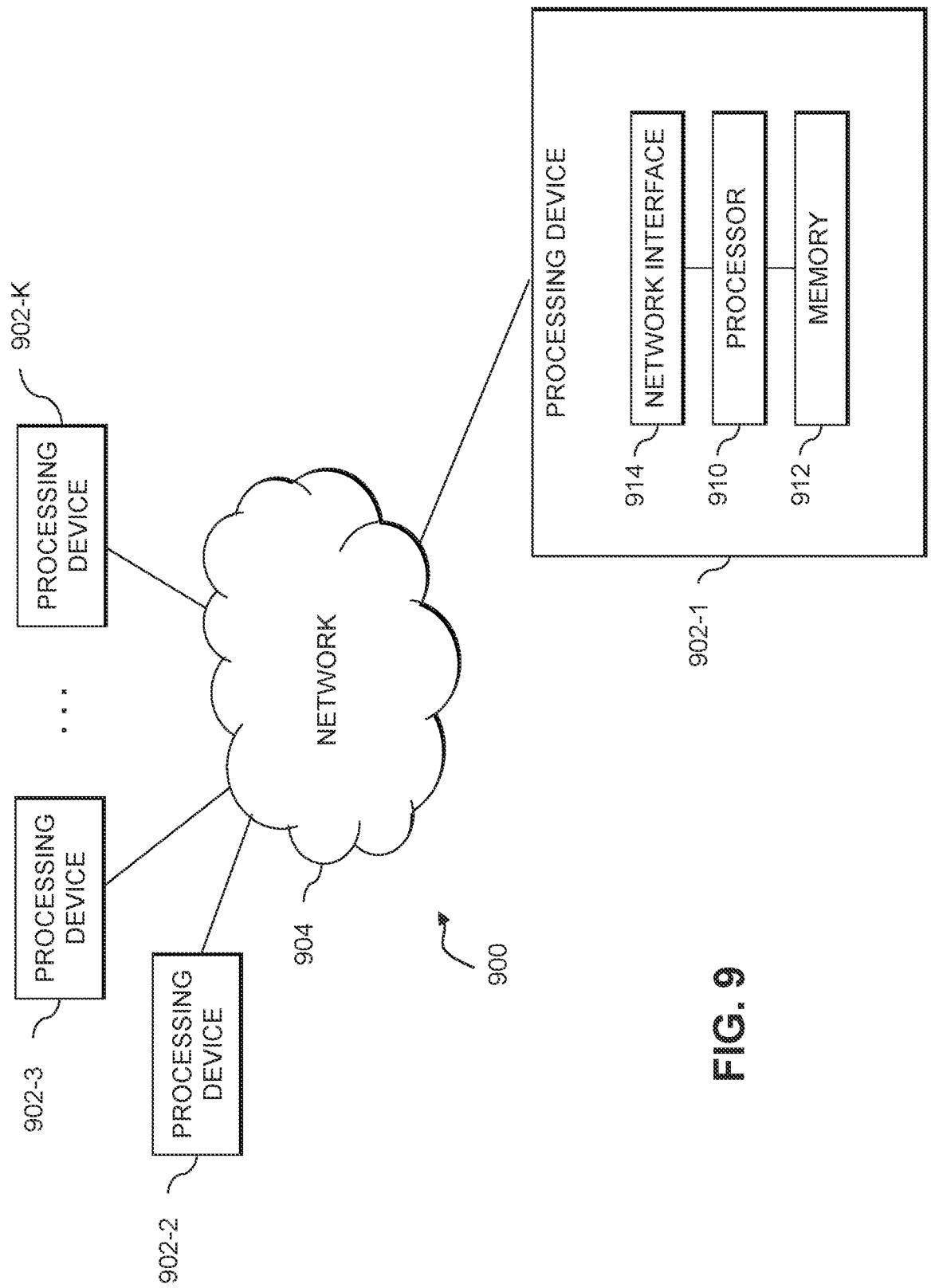

FIG. 8 shows an example processing platform comprising cloud infrastructure 800. The cloud infrastructure 800 comprises a combination of physical and virtual processing resources that may be utilized to implement at least a portion of the information processing system 100 in FIG. 1. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, ... 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automated causal analysis of issues affecting workloads executing in an IT infrastructure as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, learning models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to execute a first set of a plurality of workloads on a set of storage systems of an information technology infrastructure, wherein executing the first set of the plurality of workloads produces a plurality of workload traces characterizing resource execution metrics associated with the execution of the first set of the plurality of workloads, wherein one of the resource execution metrics comprises an execution time of at least a subset of the first set of the plurality of workloads;
   responsive to an occurrence of one or more issues causing the execution time of the subset of the first set of the plurality of workloads to exceed an expected execution time, to at least one of (i) expand at least one storage system in the set of storage systems of the information technology infrastructure, and (ii) deploy one or more additional storage systems in the set of storage systems of the information technology infrastructure; and to execute a second set of the plurality of workloads on the set of storage systems in the information technology infrastructure;

wherein the occurrence of the one or more issues is based at least in part on one or more clusters of causal topics that comprise at least one causal topic that is part of a first set of causal topics and a second set of causal topics, the first set of causal topics being based at least in part on a first set of recurring patterns of relationships between different ones of the resource execution metrics in a first set of workload causality profiles, the first set of workload causality profiles being based at least in part on a dependence measurement model and the plurality of workload traces, the second set of causal topics being based at least in part on a second set of recurring patterns of relationships between different ones of the resource execution metrics in a second set of workload causality profiles, and the second set of workload causality profiles being based at least in part on a causal model and the plurality of workload traces.

2. The apparatus of claim 1 wherein the resource execution metrics comprise two or more explanatory variable metrics and at least one response variable metric, and wherein the first and second sets of workload causality profiles characterize relationships between each of the two or more explanatory variable metrics and the at least one response variable metric.

3. The apparatus of claim 2 wherein the first and second sets of the plurality of workloads comprise backup operations executing in backup systems of the information technology infrastructure, and wherein the at least one response variable metric comprises the execution time.

4. The apparatus of claim 3 wherein the two or more explanatory variable metrics comprise two or more of:
a backup operation type of the first set of the plurality of workloads executing in the backup systems of the information technology infrastructure;
stream consumption on the backup systems of the information technology infrastructure;
backup system model numbers of the backup systems of the information technology infrastructure;
backup system processor usage of the backup systems of the information technology infrastructure;
whether garbage collection processes are running on the backup systems of the information technology infrastructure;
network issues associated with the backup systems of the information technology infrastructure; and
amounts of writes to storage devices of the backup systems of the information technology infrastructure that exceed a designated latency threshold.

5. The apparatus of claim 1 wherein the dependence measurement model comprises a Schweizer-Wolff dependence measurement model.

6. The apparatus of claim 1 wherein the causal model comprises a Rubin causal model.

7. The apparatus of claim 1 wherein the first and second sets of causal topics are based at least in part on a topic model, wherein the workload causality profiles represent documents, the resource execution metrics represent words, and the causal topics comprise explanations for issues affecting the execution time of the first set of the plurality of workloads on the set of storage systems in the information technology infrastructure.

8. The apparatus of claim 7 wherein the topic model comprises a Latent Dirichlet Allocation (LDA) topic model.

9. The apparatus of claim 7 wherein a given one of the causal topics comprises probabilities of two or more of the resource execution metrics being a cause of one or more issues encountered during execution of a given one of the first set of the plurality of workloads executed on the set of storage systems of the information technology infrastructure.

10. The apparatus of claim 1 wherein the one or more clusters of causal topics are based at least in part on an ensemble learning algorithm.

11. The apparatus of claim 10 wherein the ensemble learning algorithm utilizes agglomerative hierarchical clustering.

12. The apparatus of claim 1 wherein the occurrence of the one or more issues affecting at least the subset of the first set of the plurality of workloads executed on the set of storage systems of the information technology infrastructure is based at least in part on explanations for the subset of the first set of the plurality of workloads violating one or more service level agreements.

13. The apparatus of claim 1 wherein at least one workload in the second set of the plurality of workloads comprises a re-execution of at least one workload in the first set of the plurality of workloads that failed during execution.

14. The apparatus of claim 13 wherein the at least one workload in the first set of the plurality of workloads failed during execution on a first subset of the set of storage systems the information technology infrastructure, and wherein the execution of said at least one workload in the second set of the plurality of workloads comprises execution on a second subset of the set of storage systems of the information technology infrastructure, the second set of the storage systems being different than the first set of the storage systems.

15. A computer program product comprising a non-transitory processor-readable storage medium having stored therein program code of one or more software programs, wherein the program code when executed by at least one processing device causes the at least one processing device:
to execute a first set of a plurality of workloads on a set of storage systems of an information technology infrastructure, wherein executing the first set of the plurality of workloads produces a plurality of workload traces characterizing resource execution metrics associated with the execution of the first set of the plurality of workloads, wherein one of the resource execution metrics comprises an execution time of at least a subset of the first set of the plurality of workloads;
responsive to an occurrence of one or more issues causing the execution time of the subset of the first set of the plurality of workloads to exceed an expected execution time, to at least one of (i) expand at least one storage system in the set of storage systems of the information technology infrastructure, and (ii) deploy one or more additional storage systems in the set of storage systems of the information technology infrastructure; and
to execute a second set of the plurality of workloads on the set of storage systems of the information technology infrastructure;
wherein the occurrence of the one or more issues is based at least in part on one or more clusters of causal topics that comprise at least one causal topic that is part of a first set of causal topics and a second set of causal topics, the first set of causal topics being based at least in part on a first set of recurring patterns of relationships between different ones of the resource execution metrics in a first set of workload causality profiles, the first set of workload causality profiles being based at least in part on a dependence measurement model and the plurality of workload traces, the second set of causal topics being based at least in part on a second set of recurring patterns of relationships between different ones of the resource execution metrics in a second set of workload causality profiles, and the second set of workload causality profiles being based at least in part on a causal model and the plurality of workload traces.

16. The computer program product of claim 15 wherein the resource execution metrics comprise two or more explanatory variable metrics and at least one response variable metric, and wherein the first and second sets of workload causality profiles characterize relationships between each of the two or more explanatory variable metrics and the at least one response variable metric.

17. The computer program product of claim 16 wherein the first and second sets of the plurality of workloads comprise backup operations executing in backup systems of the information technology infrastructure, and wherein the at least one response variable metric comprises the execution time.

18. A method comprising:
   executing a first set of a plurality of workloads on a set of storage systems of an information technology infrastructure, wherein executing the first set of the plurality of workloads produces a plurality of workload traces characterizing resource execution metrics associated with the execution of the first set of the plurality of workloads, wherein one of the resource execution metrics comprises an execution time of at least a subset of the first set of the plurality of workloads;
   responsive to an occurrence of one or more issues causing the execution time of the subset of the first set of the plurality of workloads to exceed an expected execution time, at least one of (i) expanding at least one storage system in the set of storage systems of the information technology infrastructure, and (ii) deploying one or more additional storage systems in the set of storage systems of the information technology infrastructure;
   executing a second set of the plurality of workloads on the set of storage systems in the information technology infrastructure;
   wherein the occurrence of the one or more issues is based at least in part on one or more clusters of causal topics that comprise at least one causal topic that is part of a first set of causal topics and a second set of causal topics, the first set of causal topics being based at least in part on a first set of recurring patterns of relationships between different ones of the resource execution metrics in a first set of workload causality profiles, the first set of workload causality profiles being based at least in part on a dependence measurement model and the plurality of workload traces, the second set of causal topics being based at least in part on a second set of recurring patterns of relationships between different ones of the resource execution metrics in a second set of workload causality profiles, and the second set of workload causality profiles being based at least in part on a causal model and the plurality of workload traces; and
   wherein the method is performed by at least one processing device comprising a processor coupled to a memory.

19. The method of claim 18 wherein the resource execution metrics comprise two or more explanatory variable metrics and at least one response variable metric, and wherein the first and second sets of workload causality profiles characterize relationships between each of the two or more explanatory variable metrics and the at least one response variable metric.

20. The method of claim 19 wherein the first and second sets of the plurality of workloads comprise backup operations executing in backup systems of the information technology infrastructure, and wherein the at least one response variable metric comprises the execution time.

* * * * *